(12) United States Patent
Chang

(10) Patent No.: US 12,238,723 B2
(45) Date of Patent: Feb. 25, 2025

(54) LINK ADAPTATION METHOD IN MOBILE COMMUNICATION SYSTEM AND DEVICE THEREFOR

(71) Applicant: ELECTRONICS AND TELECOMMUNICATIONS RESEARCH INSTITUTE, Daejeon (KR)

(72) Inventor: Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 297 days.

(21) Appl. No.: 17/435,217

(22) PCT Filed: May 6, 2020

(86) PCT No.: PCT/KR2020/005932
§ 371 (c)(1),
(2) Date: Aug. 31, 2021

(87) PCT Pub. No.: WO2020/226411
PCT Pub. Date: Nov. 12, 2020

(65) Prior Publication Data
US 2022/0150940 A1     May 12, 2022

(30) Foreign Application Priority Data

May 7, 2019   (KR) ........................ 10-2019-0052984
Jul. 11, 2019   (KR) ........................ 10-2019-0083657

(51) Int. Cl.
*H04W 72/21*  (2023.01)
*H04L 1/1607*  (2023.01)
(Continued)

(52) U.S. Cl.
CPC ........... *H04W 72/21* (2023.01); *H04L 1/1678* (2013.01); *H04L 1/1819* (2013.01); *H04W 72/1268* (2013.01); *H04W 72/23* (2023.01)

(58) Field of Classification Search
CPC . H04W 72/21; H04W 72/23; H04W 72/1268; H04L 1/1678; H04L 1/1819
See application file for complete search history.

(56) References Cited

U.S. PATENT DOCUMENTS

| 2012/0051246 A1 | 3/2012 | Zhang et al. |
| 2015/0126239 A1 | 5/2015 | Kim et al. |

(Continued)

FOREIGN PATENT DOCUMENTS

WO   2019/098662 A1   5/2019

OTHER PUBLICATIONS

Search Report, mailed Jul. 27, 2020, for International Application No. PCT/KR2020/005932.

(Continued)

*Primary Examiner* — Won Tae C Kim
(74) *Attorney, Agent, or Firm* — LRK PATENT LAW FIRM

(57) ABSTRACT

A method for operating a transmission node performing link adaptation in a mobile communication network may include the steps of: receiving, from a resource allocation node, resource allocation information for a resource for transmission of data; determining link adaptation information and transmitting the determined link adaptation information to a reception node; and on the basis of the determined link adaptation information, transmitting the data to the reception node. Therefore, link adaptation accurately reflecting a radio channel state between a base station and terminals can be performed, thereby enabling efficient use of a radio resource.

8 Claims, 8 Drawing Sheets

(51) Int. Cl.
*H04L 1/1812* (2023.01)
*H04W 72/1268* (2023.01)
*H04W 72/23* (2023.01)

(56) References Cited

U.S. PATENT DOCUMENTS

| | | |
|---|---|---|
| 2017/0230997 A1 | 8/2017 | Damnjanovic et al. |
| 2017/0318604 A1 | 11/2017 | Liu et al. |
| 2018/0034606 A1 | 2/2018 | Ahn et al. |
| 2018/0227734 A1 | 8/2018 | Lee et al. |
| 2018/0249494 A1* | 8/2018 | Matsumoto ............ H04L 1/1896 |
| 2019/0069319 A1* | 2/2019 | Arshad ................. H04W 72/23 |
| 2019/0090265 A1* | 3/2019 | Zhang .................... H04L 5/1438 |
| 2019/0097550 A1 | 3/2019 | Malrait et al. |
| 2019/0097750 A1 | 3/2019 | Sanderg et al. |
| 2019/0253192 A1* | 8/2019 | Zhou ..................... H04W 72/20 |
| 2020/0288432 A1 | 9/2020 | Min et al. |

OTHER PUBLICATIONS

Written Opinion, mailed Jul. 27, 2020, for International Application No. PCT/KR2020/005932.

Mediatek Inc., "On Sidelink Resource Allocation Mechanism", R1-1810455, 3GPP TSG RAN WG1 Meeting #94bis, Chengdu, China, Sep. 29, 2018.

Qualcomm Inc., "Support of 64-QAM for V2X Phase 2", R1-1718127, 3GPP TSG-RAN WG1 #90bis, Prague, Czech Republic, Sep. 30, 2017.

Mediatek Inc., "UE-assisted resource allocation for NR V2X", R2-1813673, 3GPP TSG-RAN WG2 Meeting #103bis, Chengdu, China, Sep. 28, 2018.

Intel Corp., "Uu-based Sidelink Resource Allocation for V2X Use Cases", R1-1902486, 3GPP TSG RAN WG1 Meeting #96, Athens, Greece, Feb. 16, 2019.

* cited by examiner

LINK ADAPTATION METHOD IN MOBILE COMMUNICATION SYSTEM AND DEVICE THEREFOR

CROSS-REFERENCE TO RELATED APPLICATIONS

The present application is a U.S. National Phase entry from International Application No. PCT/KR2020/005932, filed on May 6, 2020, which claims priority to Korean Patent Application No. 10-2019-0052984, filed on May 7, 2019, and No. 10-2019-0083657, filed on Jul. 11, 2019, the disclosure of which is incorporated by reference herein in their entirety.

TECHNICAL FIELD

The present invention relates to techniques for link adaptation in a mobile communication system, and more particularly, to a transmitting node based link adaptation method for enhancing performance of radio link adaptation in a mobile communication system, and an apparatus therefor.

BACKGROUND ART

In a mobile communication system, a base station connected to a network provides a radio connection to a terminal existing in a coverage area. The terminal may bi-directionally connect to the network through a procedure of bi-directionally exchanging data with the connected base station. The moving terminal can maintain the connection with the network by changing the connected base station through a handover. The base station providing services to the terminal performs a role of managing resources. The terminal managed by the base station can exchange data with the base station through a procedure of transmitting and receiving radio signals in resources allocated by the base station.

The base station may be variously configured according to the size of the coverage area to which the base station provides services. The base stations providing various coverage areas may be arranged to overlap their coverage areas to provide radio access to the terminal. In general, the size of the coverage area provided by the base station is dependent on a frequency, and decreases as the frequency increases. A plurality of transmission and reception points constitute a part of the base station as devices for transmitting and receiving radio signals with the terminal, and constitute the base station at the same location or distributed locations. The base station is configured in a manner in which radio access functions are concentrated or in a manner in which radio access functions are distributed. The base station having a structure in which the radio access functions are distributed may be configured as a central unit (CU) providing upper functions and at least one distributed unit (DU) providing lower functions.

The terminal transmits and receives radio signals to and from a cell provided by the base station in a radio section, and transmits and receives data by using a radio access protocol in which the radio access functions are hierarchically configured. Service packets generated at a service layer are transmitted to a counterpart through the radio access protocol. The base station can distribute the radio access protocol in functional units, and may be configured as a set of devices distributed in the functional units. The radio access functions provided by the radio access protocol generally use a single frequency band, and constitute a bandwidth part within a system band. As a method of using multiple frequencies, a carrier aggregation (CA) function and a dual connectivity (DC) function may be used according to the method of configuring the radio access protocol.

The base station that manages radio resources may allocate radio resources to the terminal and determine a transmission and reception scheme of the terminal by reflecting a dynamically changing radio channel. When the terminal receives resource allocation information determined by the base station at the time of measuring the radio channel and transmits data based on the resource allocation information, a delay between the time of measuring the radio channel and the time of transmitting the data may occur. In order to reduce the delay, a radio link adaptation method capable of rapidly reflecting the state of the radio channel is required.

DISCLOSURE

Technical Problem

An objective of the present invention for solving the above-described problem is directed to providing an operation method of a communication node performing link adaptation (i.e., transmitting node) in a mobile communication system.

Another objective of the present invention for solving the above-described problem is directed to providing an operation method of a communication node performing resource allocation (i.e., resource allocation node or receiving node) in a mobile communication system.

Yet another objective of the present invention for solving the above-described problem is directed to providing composition of a communication node performing link adaptation in a mobile communication system.

Technical Solution

In order to achieve the above-described objective of the present invention, an exemplary embodiment of the present invention, as an operation method of a communication node performing link adaptation in a mobile communication network, may comprise receiving resource allocation information of a resource for transmission of data from a resource allocation node; determining link adaptation information, and transmitting the determined link adaptation information to a receiving node; and transmitting the data to the receiving node based on the determined link adaptation information.

The resource for the transmission of the data may be a resource allocated by a dynamic grant scheme or a configured grant scheme.

The determined link adaptation information may be transmitted as included in a link adaptation information region configured in a part of the resource for the transmission of the data.

At least one combination of information elements that the link adaptation information region includes may be configured between the communication node and the receiving node by a higher layer signaling procedure, and one of the at least one combination may be selected by using higher layer signaling, a MAC control element (CE), or downlink control information (DCI).

A link adaptation information indicator indicating whether the link adaptation information is transmitted to the receiving node may be further included in the link adaptation information region.

When the resource allocation node is identical to the receiving node, the link adaptation information region may further include a resource request indicator requesting allocation of an additional resource from the resource allocation node.

The link adaptation information may include modulation and coding scheme (MCS) adaptation information and/or hybrid automatic repeat request (HARQ) adaptation information applied to the transmission of the data, and the HARQ adaptation information may include at least one of an HARQ process number, a new data indicator (NDI), and a redundancy version (RV).

The HARQ process number may be determined based on a location of a resource for initial transmission of the data when a retransmission function is not allowed, and the HARQ process number may be selected by the communication node when a retransmission function is allowed.

The HARQ process number may be determined within a range of HARQ process numbers, which is represented by a number of HARQ process numbers and a starting HARQ process number.

In order to achieve the above-described another objective of the present invention, an exemplary embodiment of the present invention, as an operation method of a communication node performing resource allocation in a mobile communication network, may comprise transmitting resource allocation information of a resource for transmission of data to a transmitting node; receiving link adaptation information determined by the transmitting node from the transmitting node; and receiving the data from the transmitting node based on the determined link adaptation information.

The resource for the transmission of the data may be a resource allocated by a dynamic grant scheme or a configured grant scheme.

The determined link adaptation information may be received as included in a link adaptation information region configured in a part of the resource for the transmission of the data.

At least one combination of information elements that the link adaptation information region includes may be configured between the transmitting node and the communication node by a higher layer signaling procedure, and one of the at least one combination may be selected by using higher layer signaling, a MAC control element (CE), or downlink control information (DCI).

A link adaptation information indicator indicating whether the link adaptation information may be transmitted from the transmitting node is further included in the link adaptation information region.

The link adaptation information region may further include a resource request indicator requesting allocation of an additional resource from the communication node.

The link adaptation information may include modulation and coding scheme (MCS) adaptation information and/or hybrid automatic repeat request (HARQ) adaptation information applied to the transmission of the data, and the HARQ adaptation information may include at least one of an HARQ process number, a new data indicator (NDI), and a redundancy version (RV).

The HARQ process number may be determined based on a location of a resource for initial transmission of the data when a retransmission function is not allowed, and the HARQ process number may be selected by the transmitting node when a retransmission function is allowed.

In order to achieve the above-described yet another objective of the present invention, an exemplary embodiment of the present invention, as a communication node performing link adaptation in a mobile communication network, may comprise a processor and a memory storing at least one instruction executable by the processor, wherein when executed by the processor, the at least one instruction causes the processor to receive resource allocation information of a resource for transmission of data from a resource allocation node; determine link adaptation information, and transmit the determined link adaptation information to a receiving node; and transmit the data to the receiving node based on the determined link adaptation information.

The determined link adaptation information may be transmitted as included in a link adaptation information region configured in a part of the resource for the transmission of the data.

The link adaptation information may include modulation and coding scheme (MCS) adaptation information and/or hybrid automatic repeat request (HARQ) adaptation information applied to the transmission of the data, and the HARQ adaptation information may include at least one of an HARQ process number, a new data indicator (NDI), and a redundancy version (RV).

Advantageous Effects

According to the exemplary embodiments of the present invention, link adaptation can be performed accurately by reflecting the radio channel state between the base station and the terminals, thereby enabling efficient use of radio resources.

MODES OF THE INVENTION

Figure 1:
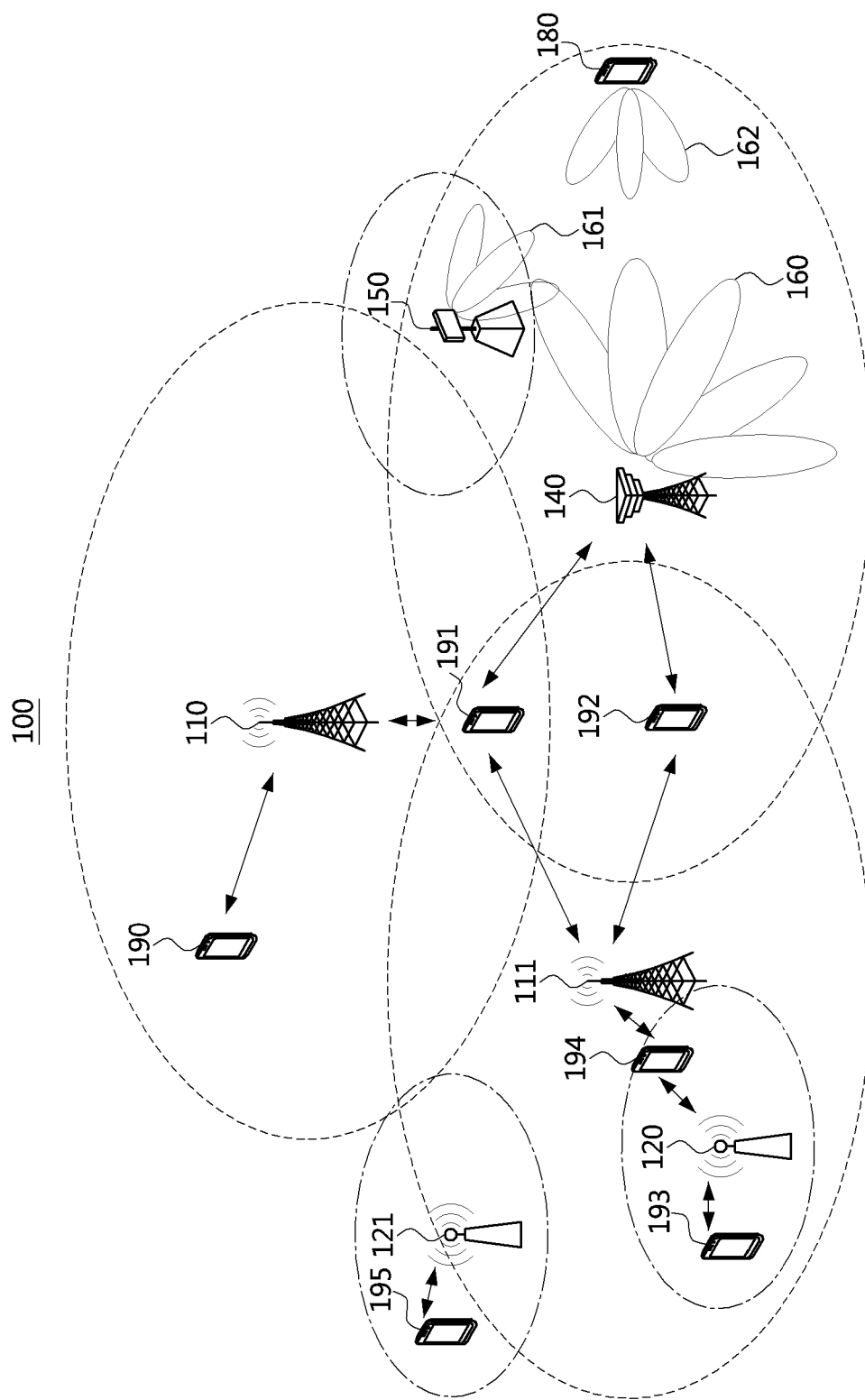
FIG. 1 is a conceptual diagram illustrating an exemplary embodiment of a mobile communication network to which exemplary embodiments of the present invention are applied.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

FIG. 1 is a conceptual diagram illustrating an exemplary embodiment of a mobile communication network to which exemplary embodiments of the present invention are applied.

As shown in FIG. 1, a mobile communication network 100 may comprise a plurality of communication nodes 110, 111, 120, 121, 140, 150, 180, 190, 191, 192, 193, 194, and 195. Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a space division multiple access (SDMA) based communication protocol, or the like.

The mobile communication network 100 may comprise a plurality of base stations (BSs) 110, 111, 120, 121, 140, and 150, and a plurality of terminals (user equipments (UEs)) 190, 191, 192, 193, 194, 195, and 180. Each of the plurality of base stations 110, 111, and 140 may form a macro cell. Alternatively, each of the plurality of base stations 120, 121, and 150 may form a small cell. The plurality of base station 190 and 191 may belong to a cell coverage of the base station 110. The plurality of base stations 120 and 121 and the plurality of terminals 191, 192, 193, 194, and 195 may belong to a cell coverage of the base station 111. The base station 150 and the plurality of terminals 191, 192, and 180 may belong to a cell coverage of the base station 140.

Each of the plurality of communication nodes 110, 111, 120, 121, 140, 150, 180, 190, 191, 192, 193, 194, and 195 may support a radio access protocol specification of a radio access technology based on cellular communication (e.g., long term evolution (LTE), LTE-Advanced (LTE-A), new radio (NR), etc. which are defined in the $3^{rd}$ generation partnership project (3GPP) standard). Each of the plurality of base stations 110, 111, 120, 121, 140, and 150 may operate in a different frequency band, or may operate in the same frequency band. The plurality of base stations 110, 111, 120, 121, 140, and 150 may be connected to each other through an ideal backhaul or a non-ideal backhaul, and may exchange information with each other through the ideal backhaul or the non-ideal backhaul. Each of the plurality of base stations 110, 111, 120, 121, 140, and 150 may be connected to a core network (not shown) through a backhaul. Each of the plurality of base stations 110, 111, 120, 121, 140, and 150 may transmit data received from the core network to the corresponding terminals 190, 191, 192, 193, 194, 195, and 180, and transmit data received from the corresponding terminals 190, 191, 192, 193, 194, 195, and 180 to the core network.

Each of the plurality of communication nodes 110, 111, 120, 121, 140, 150, 180, 190, 191, 192, 193, 194, and 195 constituting the mobile communication network 100 may exchange signals with a counterpart communication node without interferences by using a beam formed through a beamforming function using multiple antennas.

Each of the plurality of base stations 110, 111, 120, 121, 140, and 150 may support multiple input multiple output (MIMO) transmissions using multiple antennas (e.g., single user (SU)-MIMO, multi user (MU)-MIMO, massive MIMO, etc.), coordinated multipoint (CoMP) transmission, carrier aggregation (CA) transmission, unlicensed band transmission, device-to-device (D2D) communication, proximity services (ProSe), dual connectivity transmission, and the like.

Each of the plurality of base stations 110, 111, 120, 121, 140, and 150 may be referred to as a NodeB, evolved NodeB, gNB, ng-eNB, radio base station, access point, access node, node, radio side unit (RSU), or the like. Each of the plurality of terminals 190, 191, 192, 193, 194, 195, and 180 may be referred to as a user equipment (UE), terminal, access terminal, mobile terminal, station, subscriber station, mobile station, portable subscriber station, node, device, Internet of Things (IoT) device, mounted apparatus (e.g., mounted module/device/terminal or on-board device/terminal, etc.), or the like. The content of the present invention is not limited to the above-mentioned terms, and they may be replaced with other terms that perform the corresponding functions according to a radio access protocol according to a radio access technology (RAT) and a functional configuration supporting the same.

Figure 2:
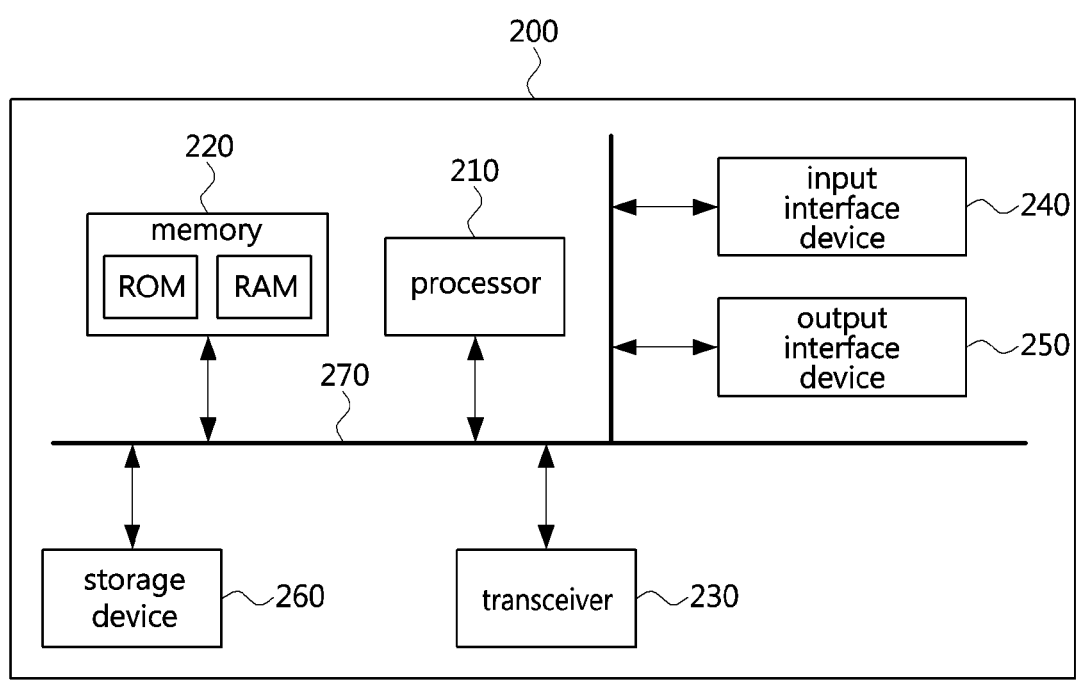
FIG. 2 is a block diagram illustrating an exemplary embodiment of a communication node constituting a mobile communication network.

FIG. 2 is a block diagram illustrating an exemplary embodiment of a communication node constituting a mobile communication network.

As shown in FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with exemplary embodiments of the present invention are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Each of the plurality of communication nodes 110, 111, 120, 121, 140, 150, 180, 190, 191, 192, 193, 194, and 195 constituting the mobile communication network 100 may be implemented in the form of the communication node 200.

Figure 3:
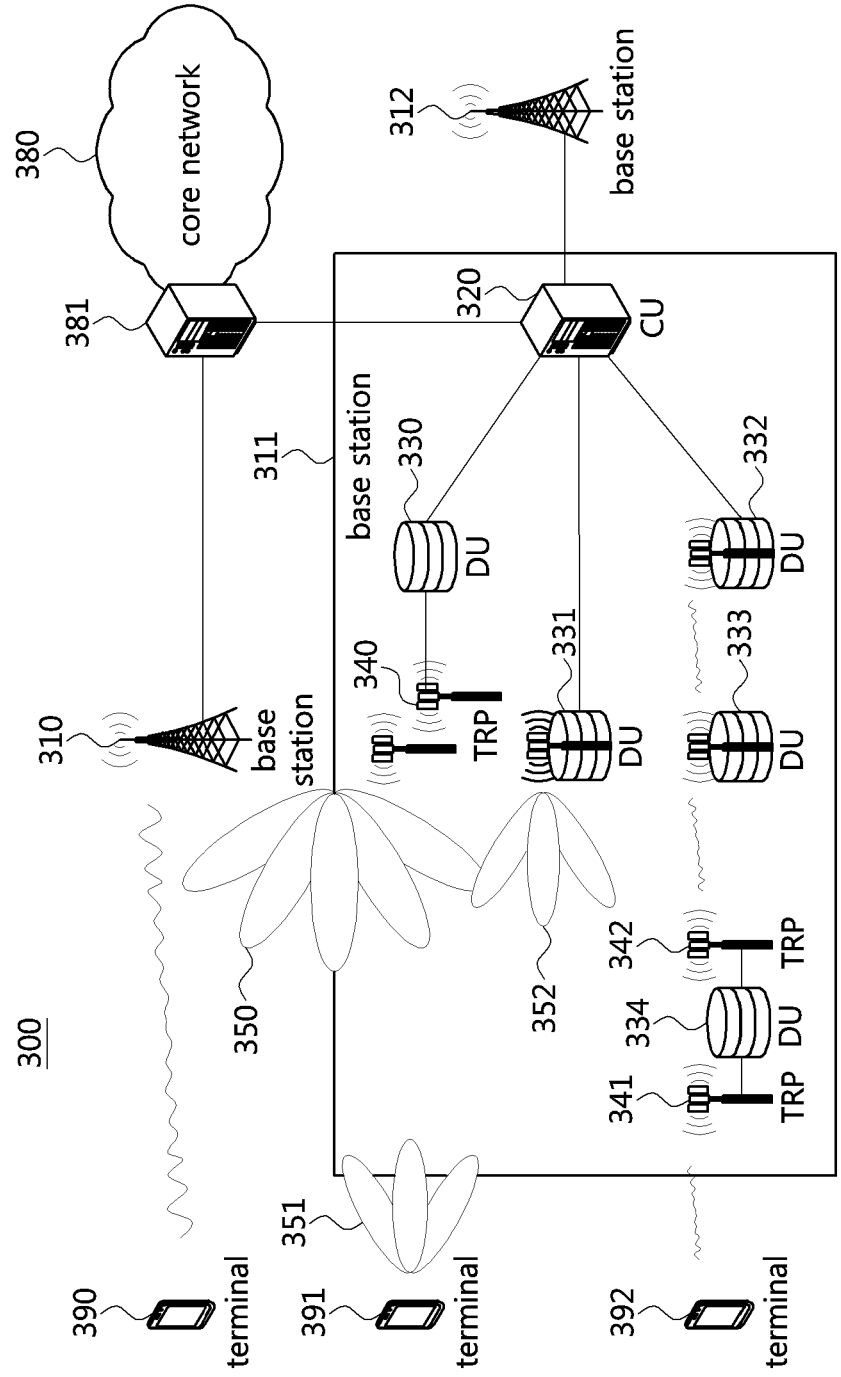
FIG. 3 is a conceptual diagram illustrating an example of connection among base stations and a core network in a mobile communication network using base stations having a distributed structure.

FIG. 3 is a conceptual diagram illustrating an example of connection among base stations and a core network in a mobile communication network using base stations having a distributed structure.

As shown in FIG. 3, in a mobile communication network 300, base stations 310, 311, and 312 may be connected with a termination node 381 of a core network 380 through a backhaul, and may bi-directionally transfer data exchanged among a plurality of terminals 390, 391, and 392 and the core network 380.

Here, the termination node 381 of the core network 380 may provide a user plane function for exchanging packets with the plurality of terminals 390, 391, and 392 and a control plane function for managing access and mobility of the terminals. The user plane function may be implemented by a serving gateway (SGW) or a user plane function (UPF). The control plane function may be implemented by a mobility management entity (MME) or an access and mobility management function (AMF).

The exemplary embodiments of the present invention to be described below are not limited to the specific terms 'SGW', 'UPF', 'MME', or 'AMF', and the above terms may be replaced with other terms according to a radio access protocol according to a radio access technology (RAT) and components of a core network supporting the radio access protocol.

The base station 311 composed of a set of devices that distributedly perform functions of the radio access protocol may be configured with a central unit (CU) having a centralized function, a plurality of distributed units (DUs) 330, 331, 332, 333, and 334 having distributed functions, and a plurality of transmission and reception points (TRPs) 340, 341, and 342 transmitting and receiving signals. In FIG. 3, only the base station 311 is shown as a base station having the distributed structure, but the remaining base stations 310 and 312 may also be configured similarly to the base station 311 having the distributed structure.

The CU 320 including upper functions of the radio access protocol may be connected with the plurality of DUs 330, 331, 332, 333, and 334 towards radio sections, may be connected with the termination node 381 towards the core network 380, and may be connected with the plurality of adjacent base stations 310 and 312. Each of the plurality of DUs 331, 332, and 333 including lower functions of the radio access protocol may be connected with a plurality of transmission and reception points located in the same locations, and each of the plurality of DUs 330 and 334 may be connected with the plurality of transmission and reception points 340, 341, and 342 located in the different locations.

Each of the plurality of base stations 310, 311, and 312 may include a plurality of transmission and reception points for transmitting and receiving radio signals, and may use data detected in the signal transmitted and received by these transmission and reception points. Each of the plurality of transmission and reception points 331, 332, 333, 340, 341, and 342 may be operated independently or may be operated in cooperation with adjacent transmission and reception points. Each of the plurality of transmission and reception points 331, 332, 333, 340, 341, and 342 may use a plurality of beams (e.g., 350 and 352) formed through a beamforming function using multiple antennas to transmit and receive signals to and from a counterpart communication node without interferences. Each of the plurality of transmission and reception points 331, 332, 333, 340, 341, and 342 may be referred to as a remote radio transceiver, a remote radio head (RRH), a radio antenna, a transmission point (TP), a transmission and reception point (TRP), or the like.

Each of the plurality of DUs 330, 331, 332, 333, and 334 may be connected to a communication node towards the core network 380 by wire or wirelessly. When connected by wire, each of the plurality of DUs 330, 331, and 332 may configure some functions of the base station radio access protocol in a radio section to provide radio access, and may be connected to the CU 320 in a wired section. When connected wirelessly, each of the plurality of DUs 333 and 334 may configure some functions of the base station radio access protocol in a radio section to provide radio access, and configure some functions of the terminal radio access protocol in a radio section, thereby being bi-directionally connected to the CU 320 by wirelessly accessing a relay device towards the CU 320.

For example, the DU 333 may wirelessly connect to the DU 332 towards the CU 320, and the DU 332 may be a relay device relaying a connection between the DU 333 and the CU 332. The DU 334 may wirelessly connect to the DU 333 towards the CU 320, and the DU 333 may be a relay device relaying a connection between the DU 334 and the CU 332. The plurality of transmission and reception points 341 and 342 connected to the DU 334 may form a beam or may be configured in a region where interferences are reduced by a physical method. The transmission and reception point 341 may configure some functions of the base station radio access protocol, and the transmission and reception point 342 may configure some functions of the terminal radio access protocol.

Each of the plurality of beams 160, 161, 162, 350, 351, and 352 formed by the plurality of communication nodes may exchange signals with a paired (configured) beam of a counterpart node. To this end, each of the communication nodes may search for a beam by measuring a reception intensity for each beam of the counterpart communication node, configure the selected beam, and change the beam configured in the communication node. By changing the beam of the communication node, the radio channel quality can be maintained in response to a change in the radio channel state or a radio channel change due to the movement of the communication node.

Hereinafter, a structure and functions of each layer of the radio access protocol providing radio access between the base station and the terminal in the mobile communication network will be described. The following description of the structure and functions of each layer of the radio access protocol is for the purpose of explaining the exemplary embodiments of the present invention, without being intended to limit the exemplary embodiments of the present invention, and may include alterations or replacements included in the concept and technical scope of the proposed technology.

The radio access protocol may provide functions in which a plurality of communication nodes exchange data and control information by using radio resources in a radio section, and may be hierarchically configured. In the cellular communication (e.g., long term evolution (LTE), LTE-Advanced (LTE-A), new radio (NR), etc. which are the $3^{rd}$ generation partnership project (3GPP) standards), the radio access protocol may be composed of a radio layer 1 (RL1) which configures physical signals, a radio layer 2 (RL2) which controls radio transmissions in radio resources shared by a plurality of communication nodes, transmits data to a counterpart node, and converges data from the counterpart node, and a radio layer 3 (RL3) which performs radio resource managements such as network information sharing, radio connection management, mobility management, and quality of service (QoS) management for multiple communication nodes participating in the mobile network.

The radio layer 1 may be a physical layer and may provide functions for data transfer. The radio layer 2 may include sublayers such as a medium access control (MAC), a radio link control (RLC), a packet data convergence protocol (PDCP), a service data adaptation protocol (SDAP), and the like. The radio layer 3 may be a radio resource control (RRC) layer, and may provide an AS layer control function.

Hereinafter, operation methods of communication nodes in a mobile communication network will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

The base station may have authority to manage radio resources in the mobile communication system. The base station may allocate a resource, and the terminal may transmit data in the allocated resource. A radio channel may be used according to a rule for exchanging data using radio signals. The radio channel has characteristics that it changes in time, and the state of the radio channel at the time when a transmitting node transmits data and a receiving node receives the data should be identified. The characteristics of the radio channel may be determined based on a radio signal received from the terminal or the base station, and a transmission and reception scheme to be used in the corresponding radio channel may be determined by reflecting the characteristics of the radio channel. Such the technique may be defined as link adaptation, and information necessary for the link adaptation may be link adaptation information.

The base station may allocate a resource, determine link adaptation information, and transmit downlink control information (DCI) including resource allocation information and the determined link adaptation information to the terminal through a physical downlink control channel (PDCCH). A transmitting node and a receiving node sharing the above information may transmit and receive data in the allocated resource. Generally, a scheme in which the base station determines link adaptation information may be applied. The base station may determine the link adaptation information, and the transmitting node receiving the determined link adaptation information may transmit data in the allocated resource according to the link adaptation information. In this scheme, a delay between a measurement time point of measuring the state of the radio channel and a transmission time point of utilizing the measured state of the radio channel may occur. That is, since the radio channel state at the time of transmission is not immediately reflected, the performance of link adaptation may be reduced.

Transmitting Node Based Link Adaptation

A concept of transmitting node based link adaptation according to an exemplary embodiment of the present invention will be described. The transmitting node based link adaptation may refer to a scheme in which a transmitting node to transmit data determines link adaptation information and transmits the determined link adaptation information by including it in a resource allocated by a resource allocation node (e.g., base station).

That is, the transmitting node may transmit the link adaptation information determined by the transmitting node and data in the resource allocated by the resource allocation node (e.g., base station). Within the allocated resource, a region including the link adaptation information (i.e., 'link adaptation information region') and a region including the data (i.e., 'data region') may be distinguished. On the other hand, the receiving node may receive the link adaption information and the data in a 2-step procedure. That is, the receiving node may first receive the link adaptation information in the allocated resource, and use it to receive the data in the allocated resource. If the receiving node does not successfully receive the data, the transmitting node may retransmit the data.

On the other hand, the link adaptation information may be transmitted through a resource separate from the resource allocated for the data. For convenience of description, the following description will describe a case in which the link adaptation information is transmitted within the resource allocated for data transmission. However, exemplary embodiments in which the link adaptation information is transmitted through a separate resource from the resource allocated for data are also possible.

The link adaptation information may include 1) modulation and coding scheme (MCS) adaptation information, and 2) hybrid automatic repeat request (HARQ) adaptation information. The link adaptation information may be further composed of various information elements. The MCS adaptation information is information that determines a modulation and coding scheme of data to be transmitted. The HARQ adaptation information is information required for HARQ operations related to initial transmission and retransmission of the data to be transmitted, and may include at least one of an HARQ process number, a new data indicator (NDI), and a redundancy version (RV).

The link adaptation information may be transmitted in a scheme of using information fields or in a scheme of using codes. In the case of using information fields, a field may be configured for each information element constituting the link adaptation information, and the size of each field (e.g., the number of bits allocated to each field) may be determined according to the size of the corresponding information element. Accordingly, the size of the region (i.e., link adaptation information region) in which the link adaptation information is transmitted may be determined as a sum of the sizes of the configured fields. In the case of using codes, an identifiable code may be assigned to each or a combination of information elements constituting the link adaptation information. For example, a code may be assigned to a combination of multiple information elements (e.g., HARQ process number, NDI, and RV) constituting the HARQ adaptation information. In this case, the size of the region (i.e., link adaptation information region) in which the link adaptation information is transmitted may be determined according to the number of bits of the code. The receiving node may determine values of the respective information elements constituting the HARQ adaptation information based on the received code.

Figure 4:
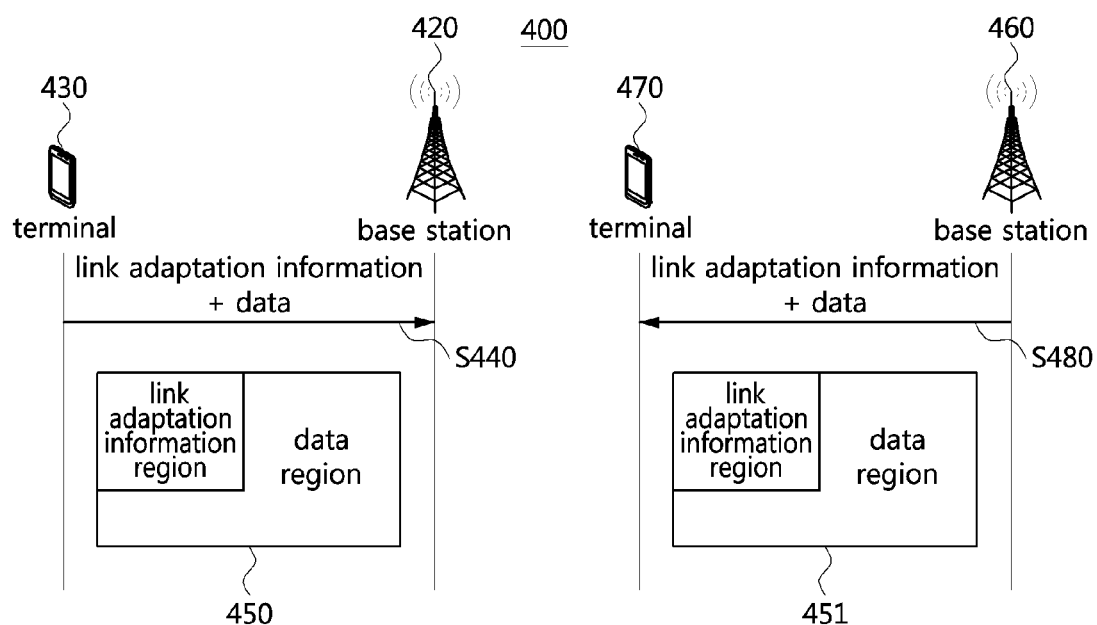
FIG. 4 illustrates flowcharts showing a transmitting node based link adaptation method according to an exemplary embodiment of the present invention.

FIG. 4 illustrates flowcharts showing a transmitting node based link adaptation method according to an exemplary embodiment of the present invention.

The left flowchart of FIG. 4 shows a case in which a terminal 430 performs uplink transmission to a base station 420 (i.e., when the terminal 430 is a transmitting node), and the right flowchart of FIG. 4 shows a case in which a base station 460 performs downlink transmission to a terminal 470 (i.e., when the base station 460 is a transmitting node).

Referring to the left flowchart of FIG. 4, the terminal 430 may perform uplink transmission and the base station 420 may receive the uplink transmission of the terminal. The terminal 430 may transmit link adaptation information determined by the terminal 430 and data to the base station 420 through a resource allocated by the base station 420. In this case, a link adaptation information region in which the link adaptation information is transmitted and a data region in which the data is transmitted may be transmitted as included in a resource 450 allocated by the base station 420. Referring to the right flowchart of FIG. 4, the base station 460 may perform downlink transmission and the terminal 470 may receive the downlink transmission of the base station. The base station 460 may transmit link adaptation information determined by the base station 460 and data to the terminal 470 through a resource allocated by the base station 460. In this case, a link adaptation information region in which the link adaptation information is transmitted and a data region in which the data is transmitted may be transmitted as included in a resource 451 allocated by the base station 460. On the other hand, although not shown in FIG. 4, the exemplary embodiment of the present invention may also be applied when the base station performs resource allocation and both the transmitting node and the receiving node are terminals (e.g., sidelink resource allocation mode 1 of the 3GPP NR).

Composition of Link Adaptation Information Region

Hereinafter, a configuration of a region (i.e., link adaptation information region) in which link adaptation information is transmitted by the transmitting node will be described. Hereinafter, the link adaptation information region may include link adaptation information (e.g., MCS adaptation information and HARQ adaptation information). Additionally, the link adaptation information region may include at least one indicator.

The at least one indicator may include a link adaptation information indicator. The link adaptation information indicator may be an indicator indicating that the link adaptation information region is transmitted as included in the allocated transmission resource, and may be transmitted at a fixed location within the transmission resource. The expression that 'the transmitting node transmits link adaptation information' may mean that 'the transmission resource includes a link adaptation information region and the transmitting node transmits link adaptation information in the link adaptation information region'. When the link adaptation information indicator is set, the link adaptation information region is included in the allocated resource. On the other hand, when the link adaptation information indicator is not set, the link adaptation information region is not included in the allocated resource.

Meanwhile, the link adaptation information indicator may be transmitted in a resource separate from the resource allocated for data transmission. For convenience of description, the following description describes a case in which the link adaptation information indicator is transmitted within the resource allocated for data transmission. However, exemplary embodiments in which the link adaptation information indicator is transmitted through a separate resource from the resource allocated for data are also possible.

As a specific configuration example of the link adaptation information indicator, when the link adaptation information indicator is set to 'TRUE (e.g., '1')', the link adaptation information region may be configured within the resource allocated for data transmission (or, separate resource). On the other hand, when the link adaptation information indicator is set to 'FALSE (e.g., '0')'—that is, not set to 'TRUE'—, the link adaptation information region may not be configured within the resource allocated for data transmission (or, separate resource). When the indicator is set to 'TRUE', the receiving node may receive the link adaptation information and receive the data by using the received link adaptation information. When the indicator is set to 'FALSE'—that is, not set to 'TRUE'—, the receiving node may receive the data based on link adaptation information that is previously shared with the transmitting node or preconfigured. When the link adaptation information indicator is used, the resource required for the link adaptation information region may be used for data transmission when the link adaptation information is not transmitted, so that the efficiency of the resource can be improved.

The at least one indicator may include a resource request indicator. The resource request indicator may be an indicator for the transmitting node to request an additional resource from the resource allocation node in an environment where the resource allocation node is different from the transmitting node (i.e., when the terminal performs uplink transmission to the base station through a resource allocated by the base station).

The transmitting node may transmit the resource request indicator by including it in the transmission resource allocated for data transmission. The resource request indicator may be included at a fixed location of the resource allocated for data transmission, similarly to the link adaptation information indicator described above, and the transmitting node and the receiving node may share the location of the resource request indicator. Accordingly, the receiving node may receive the resource request indicator before receiving the data. If the amount of resource to be additionally allocated is shared in advance by the transmitting node and the receiving node, the receiving node (i.e., resource allocation node) may identify the resource request indicator and allocate an additional resource (including a dynamic grant scheme). This may be applied when the data transmission through the allocated transmission resource is an initial transmission. In addition, when the receiving node (i.e., resource allocation node) fails to receive the data and allocates retransmission resources, the receiving node may identify the resource request indicator and allocate an additional resource (including a dynamic grant scheme).

In an exemplary embodiment to which the resource request indicator is applied, a predetermined resource may be allocated in response to the resource request. In this case, the transmitting and receiving nodes may exchange operation information of the resource request indicator through an RRC layer signaling procedure. For example, the transmitting node may transmit the resource request indicator by including it in a resource allocated by a configured grant scheme. When the transmitting node sets the resource request indicator, the resource allocation node (i.e., receiving node) that has identified this may allocate an additional resource to the transmitting node in a dynamic grant scheme. The size of the additional resource to be allocated may be shared by the transmitting and receiving nodes through an RRC layer signaling procedure.

In another exemplary embodiment to which the resource request indicator is applied, the resource request indicator may indicate that an additional resource is required when retransmission occurs. When an error occurs in a process of receiving data transmitted by the transmitting node, the receiving node (i.e., resource allocation node) may allocate a resource for retransmission. That is, the resource allocation node may refer to the resource request indicator in the process of allocating a resource for retransmission. When the resource request indicator is set, the resource allocation node (i.e., receiving node) may allocate an additional resource for retransmission to the transmitting node in a dynamic grant scheme. When the resource request indicator is not set, the resource allocation node (i.e., receiving node) may not allocate an additional resource for retransmission.

As an example, the resource request indicator may consist of 1 bit. When the 1-bit resource request indicator is not set, the resource allocation node (i.e., receiving node) may not allocate an additional resource, and the terminal may use the previously allocated resource. When the 1-bit resource request indicator is set, the resource allocation node (i.e., receiving node) may allocate an additional resource and transmit information about the additional resource to the transmitting node. When allocating an additional resource for initial transmission, the additional resource may be allocated in addition to a basic resource, and the additional resource may be used by the transmitting and receiving nodes. The additional resource may be shared through information exchanged by the nodes in advance. When allocating an additional resource for retransmission, the additional resource having a size corresponding to the retransmission data may be allocated in addition to a basic resource, and the additional resource may be used by the transmitting and receiving nodes.

The resource request indicator may be transmitted as included in the resource allocated for data transmission. In general, a L1/L2 signaling procedure may be used as a method for the terminal to request resource allocation from the base station. The L1 signaling procedure may have a scheme of transmitting a scheduling request (SR) using a physical uplink control channel (PUCCH), and in the case of the SR, it may be transmitted using a resource different from a transmission resource for data. The L2 signaling procedure may have a scheme of transmitting a buffer status report (BSR) using a MAC control element (CE), which may be transmitted as included in a transmission resource for data (i.e., as multiplexed with the data). Since the BSR is transmitted as included in the transmission resource for data, it may be utilized after receiving the data. On the other hand, since the resource request indicator according to an exemplary embodiment of the present invention is received in a region (or, a resource separate from a resource allocated to data) other than a region in which the data is transmitted (i.e., data region) within the allocated resource, the resource request indicator has a feature that it can be received regardless of whether the data has been successfully received. Therefore, even when the receiving node does not normally receive the data, the resource request indicator may be utilized to indicate whether or not to reallocate a retransmission resource.

The at least one indicator and link adaptation information described above may be configured as a part of a control channel (e.g., PUCCH) and transmitted on the control channel. The resource request indicator and/or link adaptation information indicator may be configured and transmitted as control information (e.g., uplink control information (UCI)). The MCS adaptation information and/or HARQ adaptation information included in the link adaptation information may also be configured and transmitted as control information (e.g., UCI).

Figure 5A:
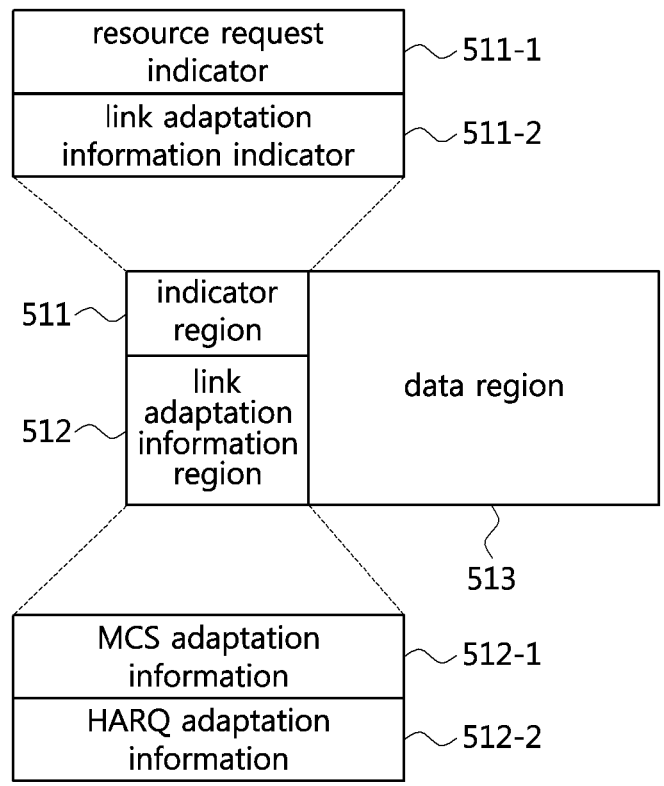
FIGS. 5A and 5B are conceptual diagrams for describing configurations of a link adaptation information region according to exemplary embodiments of the present invention.
Figure 5B:
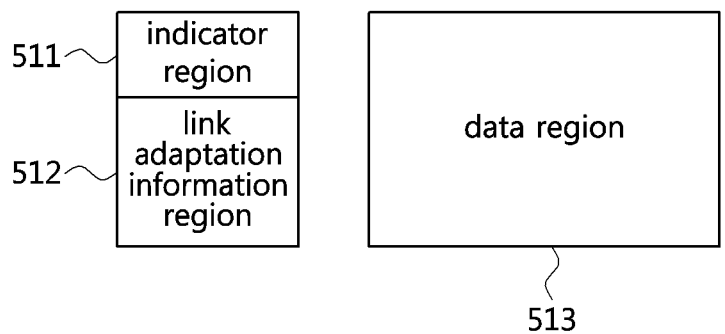

FIGS. 5A and 5B are conceptual diagrams for describing configurations of a link adaptation information region according to exemplary embodiments of the present invention.

Referring to FIG. 5A, an indicator region 511, a link adaptation information region 512, and a data region 513 may be included in a resource 510 allocated for data transmission. In addition, the indicator region 511 may include a resource request indicator 511-1 and a link adaptation information indicator 511-2. Further, the link adaptation information region 512 may include MCS adaptation information 512-1 and HARQ adaptation information 512-2.

Information elements included in the indicator region 511 and the link adaptation information region 512 included in the resource allocated for data transmission may be variously configured. The various configurations may be shared by the transmitting node and the receiving node through an RRC signaling procedure, and one of the various configurations may be used by the transmitting node and the receiving node.

For example, within the resource allocated for data transmission, the indicator region 511 may not be configured, and only the link adaptation information region 512 may be configured. Whether or not each of the MCS adaptation information 512-1 and the HARQ adaptation information 512-2 is included in the link adaptation information region 512 may also be determined through an RRC signaling procedure.

Alternatively, both the indicator region 511 and the link adaptation information region 512 may be configured in the resource allocated for data transmission. The link adaptation information indicator 511-2 may be configured at a fixed location. The link adaptation information region 512 may be included in the allocated resource when the link adaptation information indicator 511-2 is set, and may not be included in the allocated resource when the link adaptation information indicator 511-2 is not set. For example, when the link adaptation information indicator 511-2 is set to 'TRUE (e.g., '1')', the link adaptation information region 512 is included in the allocated resource, and when the link adaptation information indicator 511-2 is set to 'FALSE (e.g., '0')'— that is, not set to 'TRUE'—, the link adaptation information region 512 may not be included in the allocated resource.

Alternatively, the resource request indicator 511-1, the link adaptation information indicator 511-2, and the link adaptation information region 512 may be included in the resource allocated for data transmission. The two indicators 511-1 and 511-2 may be fixedly located in the indicator region 511, and whether or not the link adaptation information region 512 is included in the resource allocated for data transmission may be determined according to a value set to the link adaptation information indicator 511-2.

Alternatively, the resource request indicator 511-1 and the link adaptation information region 512 may be included in the resource allocated for data transmission. The resource request indicator 511-1 and the link adaptation information region 512 may be fixedly located in the resource allocated for data transmission.

Referring to FIG. 5B, the indicator region 511 and the link adaptation information region 512 may be located in the resource separate from the resource of the data region 513. Even in this case, through an RRC signaling procedure, types of information elements included in each region may be previously shared between the transmitting and receiving nodes.

HARQ Process Number Allocation

Hereinafter, a method of allocating an HARQ process number (HPN) will be described. The HARQ process number may be used to identify data during retransmission. When initial transmission is allowed in a resource allocated by a configured grant scheme or a resource allocated by a dynamic grant scheme, a case in which an entity selecting the HARQ process number becomes different may occur. That is, when the initial transmission is performed in the resource allocated by the configured grant scheme, the HARQ process number may be selected by the transmitting terminal, but when the initial transmission is performed in the resource allocated by the dynamic grant scheme, the HARQ process number may be selected by the base station. In this case, there is a need for a method for allocating the HARQ process number without collision, and this may be referred to as 'HARQ process number separation'.

The HARQ process numbers may be sequentially allocated to the resources allocated by the configured grant scheme. The resources allocated by the configured grant scheme may be resources that are allocated periodically and repeatedly without receiving resource allocation information (included in DCI). The HARQ process numbers may be sequentially allocated by utilizing such the characteristics of the resources allocated by the configured granting scheme. Since the locations of the resources allocated by the configured grant scheme are shared by the transmitting node and the receiving node, by using a method of mapping the HARQ process number to the location of the resource, the transmitting node and the receiving node may share the allocated HARQ process number without a separate signaling procedure.

A range of the HARQ process numbers mapped to the resource allocated by the configured grant scheme and the resource allocated by the dynamic grant scheme may be shared. The resource allocated by the configured grant scheme may use the HARQ process number determined based on the location of the corresponding resource, and the resource allocated by the dynamic grant scheme may use the HARQ process number not used by the resources allocated by the configured grant scheme. The allocated HARQ process number may be valid from a time point when the corresponding HARQ process number is allocated for initial transmission of data to a time point when the receiving node notifies the transmitting node through acknowledgment (ACK) feedback information that the corresponding data has been successfully received. The HARQ process number allocated to the resource allocated by the dynamic grant scheme should be released until the same HARQ process number is allocated to the resource allocated by the configured grant scheme. That is, the use of the HARQ process number for the resource allocated by the dynamic grant scheme should be completed until the resource allocated by the configured grant scheme using the same HARQ process number appears.

The range of HARQ process numbers for the resources allocated by the configured grant scheme may be separated from the range of HARQ process numbers for the resources allocated by the dynamic grant scheme. For example, the resources allocated by the configured grant scheme may uses HARQ process numbers within a range (0 to N−1), and the resources allocated by the dynamic grant scheme may use the HARQ process numbers within a range (N to N+M−1). Since the range of the HARQ process numbers is separated for each resource, this method may be applied even when a different method or entity is used for selecting the HARQ process number. The ranges of the HARQ process numbers may be shared in advance by the transmitting node and the receiving node using an RRC message or a MAC CE.

For example, the range of the HARQ process numbers used for the configured grant scheme may be represented by the number of HARQ process numbers and a starting HARQ process number. The range of the HARQ process numbers may be shared in a signaling procedure for configuring the configured grant scheme using an RRC message. In the configured grant scheme, the HARQ process numbers may be sequentially allocated to periodic resources. The HARQ process numbers may be repeatedly allocated in order of the starting HARQ process number, the starting HARQ process number+1, . . . , the starting HARQ process number+the number of the HARQ process numbers−1. Alternatively, the HARQ process number may be selected by the transmitting node for the resource of the configured grant scheme, and the HARQ process number may be signaled as included in the link adaptation information corresponding to the selected resource.

By using a separate HARQ process number identifier, the HARQ process numbers for the resources allocated by the dynamic grant scheme and the HARQ processor numbers for the resources allocated by the configured grant scheme may be distinguished. The resource for initial transmission may be uniquely identified by a combination of the HARQ process number and the HARQ process number identifier. The HARQ process number may be determined based on the resource allocated by the configured grant scheme and the resource allocated by the dynamic grant scheme, and an entity (e.g., the base station or the transmitting terminal) that has allocated the corresponding HARQ process number may be identified by the HARQ process number identifier. For example, when the HARQ process number identifier is set to 'TRUE (e.g., '1')', the HARQ process number for the resource allocated by the dynamic grant scheme may be indicated, and when the HARQ process number identifier is set to 'FALSE (e.g., '0')', The HARQ process number for the resource allocated by the configured grant scheme may be indicated. The HARQ process number identifier may be transmitted as included in the DCI or the link adaptation information according to the above-described exemplary embodiments.

On the other hand, a signaling procedure for allocating configured grant resources valid for a predetermined period of time may be used. The resource allocation node may allocate resources, which are repeatedly valid for a predetermined period of time, by the configured grant scheme. The resources may be configured through a procedure in which the transmitting node and the receiving node exchange information using an RRC message or a MAC CE. The transmitting node and the receiving node may configure the resources by using a DCI and a MAC CE. In this case, the predetermined period of time may not be configured, and the configured resources may be valid until a signal procedure for releasing the configured resources.

Through a signaling procedure, information such as a period for which the configured grant is valid, an allocation repetition periodicity of initial transmission, an allocation size of initial transmission, and whether to use a dynamic grant resource when retransmitting may be shared between the transmitting node and the receiving node. The signaling procedure may include a procedure of configuring, changing, or releasing the exchanged information between the transmitting node and the receiving node. The resource allocation of the configured grant scheme may include 1) a case when resources for initial transmission are allocated repeatedly and periodically, 2) a case when an additional resource for retransmission is allocated, and 3) a case when resources used for initial transmission and retransmission are allocated repeatedly and periodically.

Meanwhile, when the resource allocated by the configured grant scheme and the resource allocated by the dynamic grant scheme are used in the same transmission time interval (TTI), each resource may be used as an independent resource, or used as an integrated resource. Alternatively, a resource selected according to a priority may be used. When each resource is operated as an independent resource, each transport block (TB) data may be transmitted through each resource. The receiving node may acquire the transport block data from each resource. When the resource allocated by the configured grant scheme and the resource allocated by the dynamic grant scheme are operated as an integrated resource, one transport block may be configured, and the transport block may be transmitted as separated through the resource allocated by the configured grant scheme and the resource allocated by the dynamic grant scheme. The receiving node may acquire data of the one transport block. When a resource is selected according to a priority, a resource having a high priority may be activated and the transport block may be transmitted through the selected resource, so that the receiving node may acquire the transport block data from the resource having the high priority. The priority for selecting the resource may be shared between the transmitting and receiving nodes in the signaling procedure.

The base station may transmit to the terminal information on whether to operate the resource allocated by the configured grant scheme and the resource allocated by the dynamic grant scheme as an integrated resource by including it in the DCI that transmits the allocation information of the dynamic grant resource. The terminal may receive the DCI and obtain information on whether to operate the resource allocated by the configured grant scheme and the resource allocated by the dynamic grant scheme as an integrated resource, and accordingly, may operate the resource allocated by the configured grant scheme and the dynamic grant scheme as an integrated resource.

When the resource allocated by the configured grant scheme and the resource allocated by the dynamic grant scheme are located in the same TTI or the resources are overlapped, the terminal may preferentially use the resource allocated by the dynamic grant scheme. The base station may recover resources not used by the terminal from the resources allocated by the configured grant scheme, and operate the resources by allocating them to other terminals.

Signaling Procedure for Link Adaptation

Hereinafter, a signaling procedure for the transmitting node based link adaptation described above will be described. The signaling procedure for the transmitting node based link adaptation may be a procedure for configuring parameters for determining operations required for the transmitting node based link adaptation. For example, information elements included in the indicator region 511 and the link adaptation information region 512, which may be included in the resource allocated for data transmission, may be configured by the signaling procedure. Information on whether the resource request indicator 511-1 and/or the link adaptation information indicator 511-2 is included in the indicator region 511 and information on whether the MCS adaptation information 512-1 and/or the HARQ adaptation information 512-2 is included in the link adaptation information region 512 may be exchanged in the signaling procedure. The signaling procedure may be performed using an RRC message or MAC CE.

In order to dynamically change the configuration of the link adaptation information region and the indicator region, the signaling procedure may be performed as a 2-step procedure, which includes a step of configuring various compositions of the indicator region or the link adaptation information region (e.g., whether the indicator region or the link adaptation information region is present and combinations of information elements that the indicator region or the link adaptation information region includes) and a step of selecting one of the various compositions.

For example, combinations of information elements included in the indicator region and the link adaptation information region may be defined in form of a set (or list), and delivered to the terminal in form of an RRC message during connection configuration between the base station and the terminal. For example, a form in which only the fixed link adaptation information region is configured without the indicator region, a form in which the indicator region is configured to include the resource request indicator, a form in which the link adaptation information indicator is included and the link adaptation information region is configured according to the link adaptation information indicator, or the like may be available.

Then, the step of selecting one of the configured combinations may be performed between the transmitting node and the receiving node before the transmitting node performs transmission. The signaling procedure for the selection may be performed in form of an RRC message, a MAC CE, or a DCI. The RRC message may be used when using the L3 control signaling procedure, and the MAC CE may be used when using the L2 control signaling procedure. The DCI may be used in the L1 signaling procedure in which the base station determines the composition of the link adaptation information and dynamically informs the terminal of the determined composition.

Link Adaptation in Dynamic Grant Resource Allocation

In the following, a transmitting node initiated link adaptation method for a case where resources are allocated in a dynamic grant scheme will be described.

Figure 6:
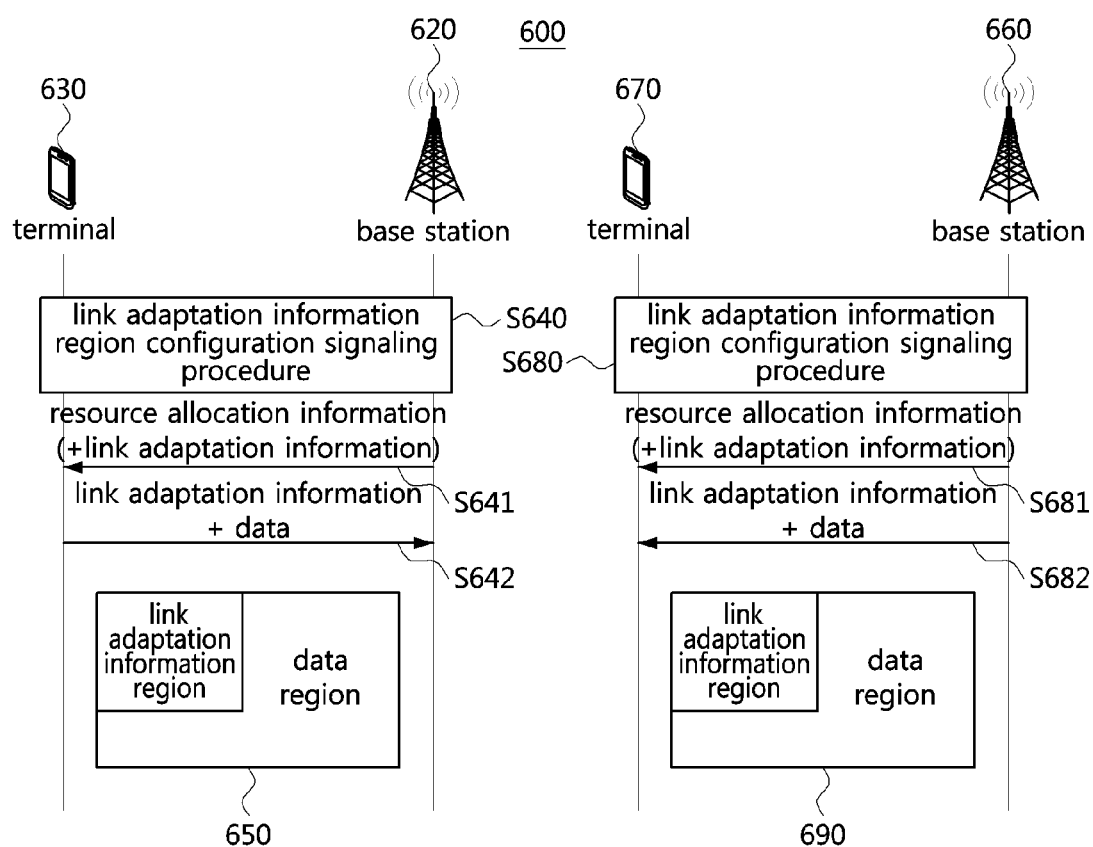
FIG. 6 illustrates flow charts showing a transmitting node based link adaptation method performed on a resource allocated by a dynamic grant scheme.

FIG. 6 illustrates flow charts showing a transmitting node based link adaptation method performed on a resource allocated by a dynamic grant scheme.

The left flowchart of FIG. 6 shows a case in which a terminal 630 operates as a transmitting node performing uplink transmission to a base station 620, and the right flowchart of FIG. 6 shows a case in which a base station 660 operates as a transmitting node performing downlink transmission to a terminal 670.

Configuration of the link adaptation information region (e.g., whether the link adaptation information region includes the MCS adaptation information and/or HARQ adaptation information) may be performed by the above-described signaling procedures (S640, S680) between the base station and the terminal.

In the dynamic grant scheme, a procedure in which the base station allocates a resource for each transmission and informs the terminal of resource allocation information for the allocated resource through a DCI may be performed (S641, S681). When the resource is allocated in the dynamic grant scheme, the transmitting node may perform the transmitting node based link adaptation by transmitting link adaptation information determined by the transmitting node in the allocated resource. When the resource is allocated in the dynamic grant scheme, the transmitting node based link adaptation method may vary according to whether the link adaptation information is included in the DCI transmitted by the base station for the dynamic grant.

When the link adaptation information is not included in the DCI received from the base station, the transmitting node may determine link adaptation information and transmit the determined link adaptation information by including it in the resource allocated through the DCI (S642, S682). The resource allocation node (i.e., base station) may transmit the resource allocation information to the transmitting node through the DCI (S641, S681), and the transmitting node may determine whether to perform initial transmission or retransmission in the allocated resource, and transmit the link adaptation information region and data through the allocated resource (S642, S682). In case of uplink transmission, the transmitting node may be the terminal, and in case of downlink transmission, the transmitting node may be the base station.

When the link adaptation information is included in the DCI received from the base station, the transmitting node may determine link adaptation information by referring to the received link adaptation information, and transmit the determined link adaptation information in the resource allocated through the DCI. The link adaptation information included in the DCI transmitted by the resource allocation node (i.e., base station) is link adaptation information recommended by the resource allocation node (i.e., base station). In general, the transmitting node may determine link adaptation information based on the link adaptation information recommended by the resource allocation node. However, the link adaptation information may be changed to transmit high-priority data according to internal priorities of the transmitting node. When the DCI received from the base station includes MCS and/or HARQ information, the transmitting node may transmit high-priority initial transmission data (e.g., URLLC) instead of data to be transmitted through the allocated resource. That is, the transmitting node may preferentially transmit data having a priority higher than the priority of data indicated by the MCS and/or HARQ information included in the DCI received from the base station.

Link Adaptation in Configured Grant Resource Allocation

Hereinafter, a transmitting node based link adaptation method for a case where a resource is allocated in the configured grant scheme will be described.

Figure 7:
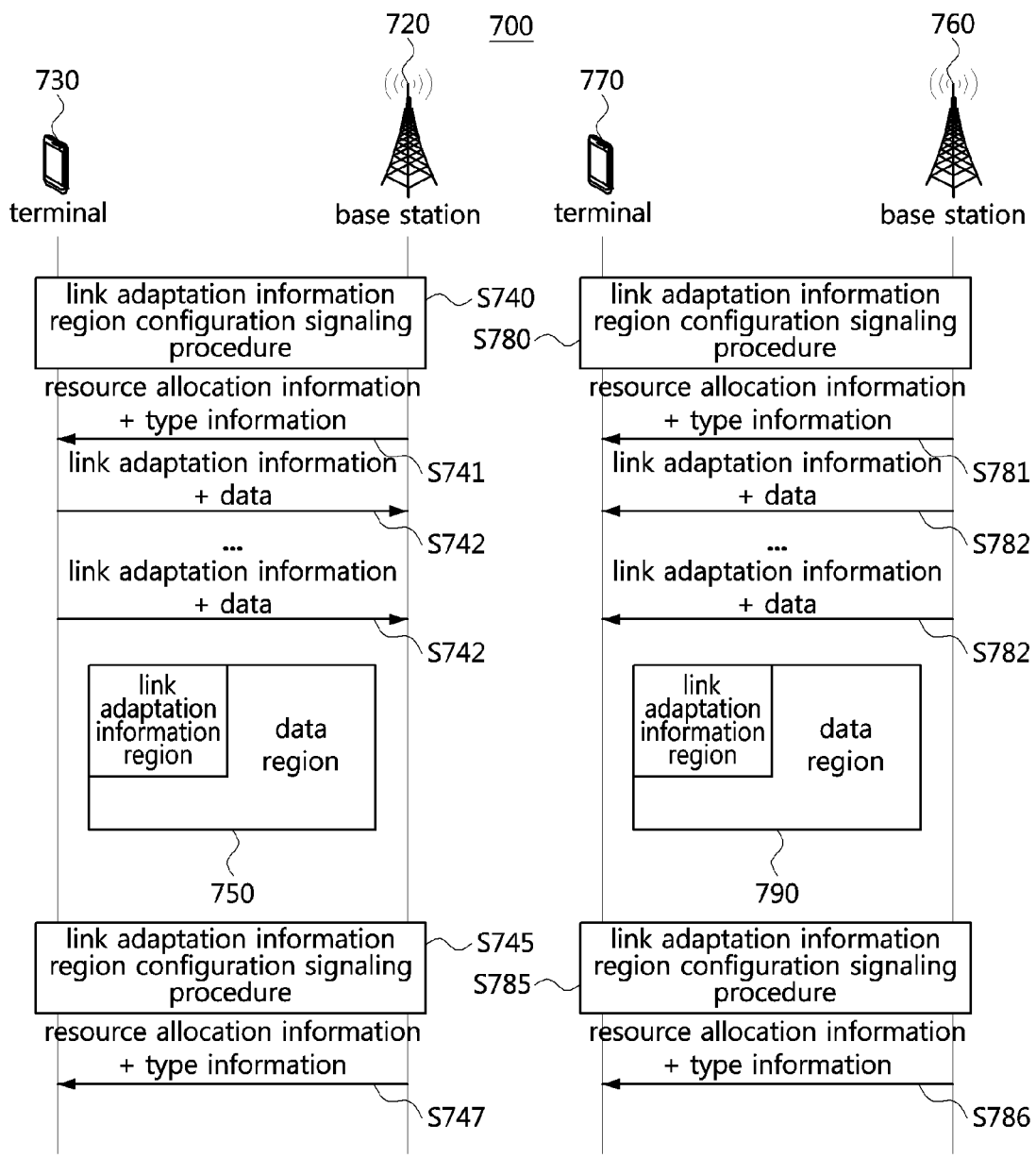
FIG. 7 illustrates flow charts showing a transmitting node based link adaptation method performed on a resource allocated in a configured grant scheme.

FIG. 7 illustrates flow charts showing a transmitting node based link adaptation method performed on a resource allocated in a configured grant scheme.

The left flowchart of FIG. 7 shows a case in which a terminal 730 operates as a transmitting node performing uplink transmission to a base station 720, and the right flowchart of FIG. 7 shows a case in which a base station 760 operates as a transmitting node performing downlink transmission to a terminal 770.

Configuration of the link adaptation information region (e.g., whether the link adaptation information region includes MCS adaptation information and/or HARQ adaptation information) may be performed by a signaling procedure (S740, S780) between the base station and the terminal described above. Meanwhile, when a resource is allocated in the configured grant scheme, 'type information' for changing the composition for the link adaptation information region may be transmitted as included in signaling for resource allocation (S741, S781). Alternatively, the 'type information' for changing the composition of the link adaptation information region may be transmitted as included in the signaling for resource allocation in the signaling procedure (S740, S780) between the base station and the terminal described above.

The resources allocated in the configured grant scheme may be resources that are allocated periodically and repeatedly for a configured period. The transmitting node may transmit data in the resources allocated by the configured grant scheme without receiving a separate DCI. The transmitting node may perform the transmitting node based link adaptation by transmitting link adaptation information in the resource allocated by the configured grant scheme. The link adaptation information determined by the transmitting node may be transmitted as included in the allocated resource. The composition of the indicator region and the link adaptation information region included in the resource allocated by the configured grant scheme may be determined through the signaling procedure between the base station and the terminal described above. The composition of the link adaptation information region may vary depending on whether the transmitting node performs initial transmission or retransmission in the allocated resource and whether the link adaptation information region is included in the allocated resource.

1) When only initial transmission is performed in the resource allocated by the configured grant scheme and the link adaptation information region is not included in the allocated resource The HARQ process number may be determined according to the location of the resource allocated by the configured grant scheme. The range of the HARQ process numbers may be indicated by the number of HARQ process numbers and a starting HARQ process number, and the HARQ process number may be sequentially determined within the range of the HARQ process numbers according to the order of resources. When the receiving node does not successfully receive data in the allocated resource, retransmission data may be transmitted by the dynamic grant scheme, and the retransmission data may be identified by the HARQ process number. Specifically, when the transmitting node is the terminal and the receiving node is the resource allocation node (i.e., in case of uplink transmission), the transmitting node may include the resource request indicator in the allocated resource and transmit it to the resource allocation node. The indicator may additionally request a resource for initial transmission to transmit new data. The additional resource may be a resource allocated by the dynamic grant scheme.

2) When only initial transmission is performed in the resource allocated by the configured grant scheme and the link adaptation information region is included in the allocated resource The transmitting node may include the link adaptation information region including MCS adaptation information and/or HARQ adaptation information determined by the transmitting node in the allocated resource, and transmit it to the receiving node. The HARQ process number of the HARQ adaptation information may be determined by the transmitting node. Specifically, when the transmitting node is the terminal and the receiving node is the resource allocation node (i.e., in case of uplink transmission), the transmitting node may include the resource request indicator in the allocated resource and transmit it to the resource allocation node. The corresponding indicator may additionally request a resource for initial transmission to transmit new data. The additional resource may be a resource allocated by the dynamic grant scheme.

3) When initial transmission or retransmission is performed in the resource allocated by the configured grant scheme and the link adaptation information region is included in the allocated resource The transmitting node may compare a priority of initial transmission data with a priority of retransmission data, include data having a high priority in the data region, and transmit the link adaptation information region including MCS adaptation information and/or HARQ adaptation information determined by the transmitting node by including it in the allocated resource. The HARQ process number of the HARQ adaptation information may be determined by the transmitting node within the range of the HARQ process numbers configured in the above-described signaling procedure. The range of the HARQ process numbers may be indicated by the number of HARQ process numbers and a starting HARQ process number. Specifically, when the transmitting node is the terminal and the receiving node is the resource allocation node (i.e., in case of uplink transmission), the transmitting node may include the resource request indicator in the allocated resource, and transmit it to the resource allocation node. The corresponding indicator may additionally request a resource for initial transmission to transmit new data. The additional resource may be a resource allocated by the dynamic grant scheme. Since when the indicator is configured, retransmission is perform in the additional resource, the transmitting node may perform initial transmission in the resource allocated by the configured grant scheme.

Hereinafter, a link adaptation method for a case where the resource allocated by the dynamic grant scheme and the resource allocated by the configured grant scheme exist together will be described.

Figure 8:
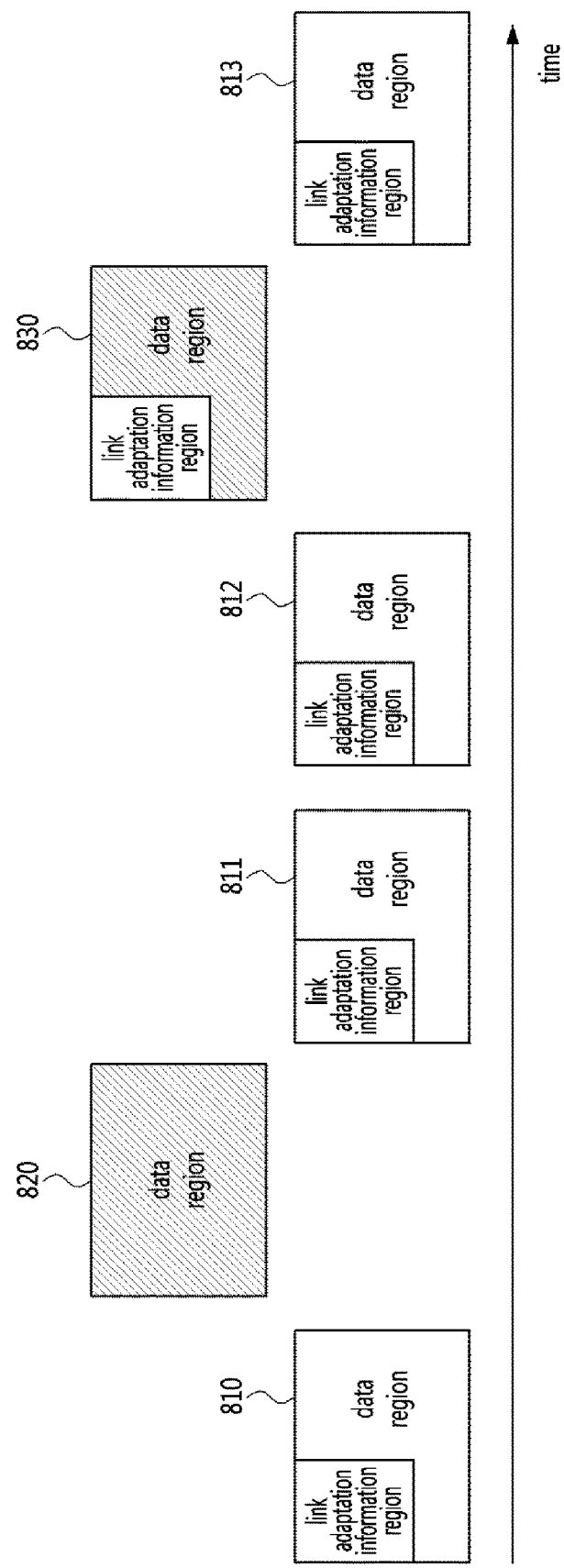
FIG. 8 is a conceptual diagram illustrating a transmitting node based link adaptation method performed on a resource allocated by a configured grant scheme and a resource allocated by a dynamic grant scheme.

FIG. 8 is a conceptual diagram illustrating a transmitting node based link adaptation method performed on a resource allocated by a configured grant scheme and a resource allocated by a dynamic grant scheme.

Referring to FIG. 8, resources 810, 811, 812, and 813 allocated by the configured grant scheme may be periodically repeated, and resources 820 and 830 allocated by the dynamic grant scheme may occur dynamically. The link adaptation information region may be fixedly included in the resource allocated by the configured grant scheme, and the link adaptation information region may or may not be included in the resource allocated by the dynamic grant scheme. Meanwhile, the link adaptation information region may not be included even in the resource allocated by the configured grant scheme. The link adaptation information region may include the indicator region 511 and the link adaptation information region 512.

The link adaptation method performed in the resource allocated by the configured grant scheme and the resource allocated by the dynamic grant scheme may be classified into four cases depending on whether initial transmission or retransmission is allowed on each resource. That is, the link adaptation method according to the exemplary embodiments of the present invention may be described according to a case where initial transmission is performed in the resource allocated by the configured grant scheme and retransmission is performed in the resource allocated by the dynamic grant scheme, a case where initial transmission is performed in the resource allocated by the configured grant scheme and initial transmission and retransmission are performed in the resource allocated by the dynamic grant scheme, a case where initial transmission and retransmission are performed in the resource allocated by the configured grant scheme and retransmission is performed in the resource allocated by the dynamic grant scheme, and a case where initial transmission and retransmission are performed in the resources allocated by the configured grant scheme and initial transmission and retransmission are also performed in the resource allocated by the dynamic grant scheme.

1) When initial transmission is performed in the resource allocated by the configured grant scheme and retransmission is performed in the resource allocated by the dynamic grant scheme The link adaptation information region may not be included in the resource allocated by the configured grant scheme. In this case, the HARQ process number determined based on the location of the resource allocated by the configured grant scheme without the link adaptation information region may be used. Alternatively, MCS adaptation information may be included in the resource allocated by the configured grant scheme. In this case, the MCS adaptation information determined by the transmitting node may be included within the link adaptation information region in the resource allocated by the configured grant scheme. Alternatively, the link adaptation information region may be included in the resource allocated by the configured grant scheme. The link adaptation information region may include the MCS adaptation information, the HARQ adaptation information, or both. In this case, the transmitting node may determine the MCS and the HARQ process number, and explicitly transmit the determined MCS and HARQ process number to the receiving node.

The link adaptation information region may not be included in the resource allocated by the dynamic grant scheme. In this case, the transmitting node may transmit data using the link adaptation information included in the DCI transmitted for dynamic grant. Alternatively, the link adaptation information indicator and the link adaptation information region may be included in the resource allocated by the dynamic grant scheme. In this case, the transmission node that selects link adaptation information identical to the link adaptation information included in the DCI transmitted for dynamic grant may not set the link adaptation information indicator (i.e., the link adaptation indicator is set to 'FALSE'—that is, not set to 'TRUE'—), and may not include the link adaptation information region in the resource allocated by the dynamic grant scheme. The transmitting node that selects link adaptation information different from the link adaptation information included in the DCI transmitted for dynamic grant may set the link adaptation information indicator in the resource allocated by the dynamic grant scheme (i.e., the link adaptation indicator is set to 'TRUE') and transmit the link adaption information region by including it in the corresponding resource. Alternatively, the link adaptation information region may be fixedly included in the resource allocated by the dynamic grant scheme. When the transmitting node transmits data in the resource allocated by the dynamic grant scheme, the transmitting node may transmit the link adaptation information by including it in the allocated resource.

2) When initial transmission is performed in the resource allocated by the configured grant scheme and initial transmission and retransmission are performed in the resource allocated by the dynamic grant scheme Retransmission may be performed in the resource allocated by the dynamic grant scheme. The resource request indicator may be transmitted as included in the resource allocated by the configured grant scheme. When the resource request indicator is set, an additional resource according to the dynamic grant scheme may be allocated for initial transmission. Since initial transmission may be performed in the resource allocated by the configured grant scheme and the resource allocated by the dynamic grant scheme, in case of uplink transmission where the transmitting node and the resource allocation node are different, it is required to distinguish the HARQ process number. Alternatively, the link adaptation information region may not be included in the resource allocated by the configured grant scheme. In this case, the HARQ process number determined based on the location of the resource allocated by the configured grant scheme without the link adaptation information region may be used. Alternatively, the MCS adaptation information may be included in the resource allocated by the configured grant scheme. The MCS adaptation information determined by the transmitting node may be included in the resource allocated by the configured grant scheme. Alternatively, the link adaptation information region may be included in the resource allocated by the configured grant scheme. The link adaptation information region may include MCS adaptation information, HARQ adaptation information, or both. In this case, the transmitting node may determine the MCS and the HARQ process number, and explicitly transmit the determined MCS and HARQ process number to the receiving node.

The link adaptation information region may not be included in the resource allocated by the dynamic grant scheme. In this case, the transmitting node may transmit data by using the link adaptation information included in the DCI transmitted for dynamic grant. Alternatively, the link adaptation information indicator and the link adaptation information region may be included in the resource allocated by the dynamic grant scheme. In this case, the transmitting node that selects link adaptation information identical to the link adaptation information included in the DCI transmitted for dynamic grant may not set the link adaptation information indicator (i.e., the link adaptation information indicator is set to 'FALSE'—that is, not set to 'TRUE'), and may not configure the link adaptation information region in the resource allocated by the dynamic grant scheme. The transmitting node that selects link adaptation information different from the link adaptation information included in the DCI transmitted for dynamic grant may set the link adaptation information indicator (i.e., the link adaptation information indicator is set to 'TRUE') in the resource allocated by the dynamic grant scheme, and transmit the link adaptation information region by including it in the corresponding resource. Alternatively, the link adaptation information region may be fixedly included in the resource allocated by the dynamic grant scheme. When the transmitting node transmits data in the resource allocated by the dynamic grant scheme, the transmitting node may transmit the link adaptation information by including it in the allocated resource.

3) When initial transmission and retransmission are performed in the resource allocated by the configured grant scheme and retransmission is performed in the resource allocated by the dynamic grant scheme Retransmission may be performed in the resource allocated by the configured grant scheme and the resource allocated by the dynamic grant scheme. The resource request indicator may be transmitted in the resource allocated by the configured grant scheme. When the resource request indicator is set, a dynamic grant additional resource for retransmission may be allocated. When the resource request indicator is set, retransmission may be performed in the resource allocated by the dynamic grant scheme, and when the resource request indicator is not set, retransmission may be performed in the resource allocated by the configured grant scheme. Alternatively, the link adaptation information region may be included in the resource allocated by the configured grant scheme. The link adaptation information region may include MCS adaptation information, HARQ adaptation information, or both. In this case, the transmitting node may determine the MCS and the HARQ process number and explicitly transmit the determined MCS and HARQ process number to the receiving node.

Alternatively, the link adaptation information indicator and the link adaptation information region may be included in the resource allocated by the configured grant scheme. When the link adaptation information indicator is set, the link adaptation information region may be included in the resource allocated by the configured grant scheme, and the link adaptation information determined by the transmitting node may be transmitted through the resource allocated by the configured grant scheme. When the link adaptation information indicator is not set, link adaptation information previously shared by the transmitting node and the receiving node may be used. When retransmission occurs in the resource allocated by the configured grant scheme and the same data as the previous transmission is transmitted, the link adaptation information indicator may not be set. In this case, the link adaptation information may not be transmitted through the resource allocated by the configured grant scheme, and link adaptation information, which was used in the previous transmission and is shared by the transmitting node and the receiving node, may be used.

Alternatively, the link adaptation information region may be included in the resource allocated by the configured grant scheme. The transmitting node may select initial transmission or retransmission data according to a priority of data, and transmit determined link adaptation information through the resource allocated by the configured grant scheme. Within the range of HARQ process numbers configured in the above-described signaling procedure, the transmitting node may select an HARQ processor number when the data is initially transmitted, and may use the HARQ processor number used for the data when the data is retransmitted. The transmitting node may toggle the NDI for the initial transmission and maintain the NDI for the retransmission. In addition, the transmitting node may select the MCS within the MCS range shared in the above-described signaling procedure.

The link adaptation information region may not be configured in the resource allocated by the dynamic grant scheme. In this case, the transmitting node may transmit data by using link adaptation information included in the DCI transmitted for dynamic grant. Alternatively, the link adaptation information indicator and the link adaptation information region may be included in the dynamic grant resource. In this case, the transmitting node that selects link adaptation information identical to the link adaptation information included in the DCI transmitted for dynamic grant may not configure the link adaptation information indicator, and may not configure the link adaptation information region in the resource allocated by the dynamic grant scheme. The transmitting node that selects link adaptation information different from the link adaptation information included in the DCI transmitted for dynamic grant may set the link adaptation information indicator in the resource allocated by the dynamic grant scheme, and transmit the link adaptation information region by including it in the corresponding resource. Alternatively, the link adaptation information region may be fixedly included in the resource allocated by the dynamic grant scheme. When the transmitting node transmits data in the resource allocated by the dynamic grant scheme, the link adaptation information may be transmitted as included in the allocated resource.

4) When initial transmission and retransmission are performed in the resource allocated by the configured grant scheme and initial transmission and retransmission are performed in the resource allocated by the dynamic grant scheme Initial transmission and retransmission may be performed in the resource allocated by the configured grant scheme as in the case 3) described above.

Retransmission may be performed in the resource allocated by the configured grant scheme and the resource allocated by the dynamic grant scheme. The resource request indicator 511-1 may be transmitted in the resource allocated by the configured grant scheme. In this case, the resource request indicator may be composed of a retransmission part and an initial transmission part. When the retransmission part of the resource request indicator is set, an additional resource according to the dynamic grant scheme may be allocated for the retransmission. When the initial transmission part of the resource request indicator is set, an additional resource according to the dynamic grant scheme may be allocated for the initial transmission. The resource request indicator may be configured in two modes of a toggle scheme. One mode may request an additional resource according to the dynamic grant scheme for initial transmission, and the other mode may request an additional resource according to the dynamic grant scheme for retransmission. The transmitting node may transmit the resource request indicator by configuring it in one of two modes.

The link adaptation information region may be included in the resource allocated by the configured grant scheme. The link adaptation information region may include MCS adaptation information, HARQ adaptation information, or both. In this case, the transmitting node may determine the MCS and/or the HARQ process number, and explicitly transmit the determined MCS and/or HARQ process number to the receiving node. Alternatively, the link adaptation information region may not be included in resource allocated by the dynamic grant scheme. In this case, the transmitting node may transmit data by using link adaptation information included in the DCI transmitted for dynamic grant. Alternatively, the link adaptation information indicator and the link adaptation information region may be included in the resource allocated by the configured grant scheme. When the link adaptation information indicator is set, the link adaptation information region may be included in the resource allocated by the configured grant scheme, and the link adaptation information determined by the transmitting node may be transmitted through the resource allocated by the configured grant scheme. When the link adaptation information indicator is not set, link adaptation information previously shared by the transmitting node and the receiving node may be used. When retransmission occurs in the resource allocated by the configured grant scheme and the same data as the previous transmission is transmitted, the link adaptation information indicator may not be configured. In this case, the link adaptation information may not be transmitted through the resource allocated by the configured grant scheme, and the link adaptation information, which was used in the previous transmission and shared by the transmitting node and the receiving node, may be used. Alternatively, the link adaptation information indicator and the link adaptation information region may be included in the resource allocated by the dynamic grant scheme. In this case, the transmitting node that selects link adaptation information identical to the link adaptation information included in the DCI transmitted for dynamic grant may not configure the link adaptation information indicator, and may not configure the link adaptation information region in the resource allocated by the dynamic grant scheme. The transmitting node that selects link adaptation information different from the link adaptation information included in the DCI transmitted for dynamic grant may configure the link adaptation information indicator in the resource allocated by the dynamic grant scheme, and transmit the link adaptation information region by including it in the corresponding resource.

Alternatively, the link adaptation information region may be fixedly included in the resource allocated by the dynamic grant scheme. When the transmitting node transmits data in the resource allocated by the dynamic grant scheme, the transmitting node may transmit the link adaptation information by including in the allocated resource.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An uplink transmission method performed by a terminal in a mobile communication network, the uplink transmission method comprising:

receiving resource allocation information from a base station, the resource allocation information allocating uplink resources including at least a first uplink resource and a second uplink resource;

performing first uplink transmission of first data and first hybrid automatic repeat request (HARQ) adaptation information through the first uplink resource; and performing second uplink transmission of second data and second HARQ adaptation information through the second uplink resource, wherein the first HARQ adaptation information indicates that the first uplink transmission is initial transmission for the first data; and when the second HARQ adaptation information indicates that the second uplink transmission is retransmission for the first data and the second HARQ adaptation information includes HARQ information indicating that the second uplink transmission is retransmission for the first data, the second uplink transmission is retransmission for the first data, wherein the first data and the first HARQ adaptation information are transmitted as being multiplexed in the first uplink transmission, and the second data and the second HARQ adaptation information are transmitted as being multiplexed in the second uplink transmission, wherein each of the first HARQ adaptation information and the second HARQ adaptation information includes at least one of an HARQ process number, a new data indicator (NDI), and a redundancy version (RV), and wherein the HARQ process number of the first HARQ adapatation information is determined based on a location of the first uplink resource when a retransmission function using periodic uplink resources allocated in a configured grant scheme is not allowed.

2. The uplink transmission method according to claim 1, wherein the resource allocation information periodically allocates the uplink resources in a configured grant scheme.

3. The uplink transmission method according to claim 1, wherein the HARQ process number of the first HARQ adaptation information is selected by the terminal when a retransmission function using periodic uplink resources allocated in a configured grant scheme is allowed.

4. The uplink transmission method according to claim 3, wherein the HARQ process number is determined within a range of HARQ process numbers, the range being represented by a number of HARQ process numbers and a starting HARQ process number.

5. An uplink reception method performed by a base station in a mobile communication network, the uplink reception method comprising:

transmitting resource allocation information to a terminal, the resource allocation information allocating uplink resources including at least a first uplink resource and a second uplink resource;

receiving first uplink transmission of first data and first hybrid automatic repeat request (HARQ) adaptation information through the first uplink resource; and receiving second uplink transmission of second data and second HARQ adaptation information through the second uplink resource, wherein the first HARQ adaptation information indicates that the first uplink transmission is initial transmission for the first data; and when the second HARQ adaptation information indicates that the second uplink transmission is retransmission for the first data and the second HARQ adaptation information includes HARQ information indicating that the second uplink transmission is retransmission for the first data, the second transmission is retransmission for the first data, wherein the first data and the first HARQ adaptation information are received as being multiplexed in the first uplink transmission, and the second data and the second HARQ adaptation information are received as being multiplexed in the second uplink transmission, wherein each of the first HARQ adaptation information and the second HARQ adaptation information includes at least one of an HARQ process number, a new data indicator (NDI), and a redundancy version (RV), and wherein the HARQ process number of the first HARQ adaptation information is determined based on a location of the first uplink resource when a retransmission function using periodic uplink resources allocated in a configured grant scheme is not allowed.

6. The uplink reception method according to claim 5, wherein the resource allocation information periodically allocates the uplink resources in a configured grant scheme.

7. The uplink reception method according to claim 5, wherein the HARQ process number of the first HARQ adaptation information is selected by the terminal when a retransmission function using periodic uplink resources allocated in a configured grant scheme is allowed.

8. The uplink reception method according to claim 7, wherein the HARQ process number is determined within a range of HARQ process numbers, the range being represented by a number of HARQ process numbers and a starting HARQ process number.

* * * * *